US010839156B1

(12) United States Patent
Saxena et al.

(10) Patent No.: US 10,839,156 B1
(45) Date of Patent: Nov. 17, 2020

(54) ADDRESS NORMALIZATION USING DEEP LEARNING AND ADDRESS FEATURE VECTORS

(71) Applicant: Amazon Technologies, Inc., Seattle, WA (US)

(72) Inventors: Satyam Saxena, Lucknow (IN); Sourav Kumar Agarwal, Sundargarh (IN); Alok Chandra, Hyderabad (IN)

(73) Assignee: Amazon Technologies, Inc., Seattle, WA (US)

( * ) Notice: Subject to any disclaimer, the term of this patent is extended or adjusted under 35 U.S.C. 154(b) by 140 days.

(21) Appl. No.: 16/239,241

(22) Filed: Jan. 3, 2019

(51) Int. Cl.
*G06F 40/284* (2020.01)
*H04L 29/08* (2006.01)
*G06N 20/00* (2019.01)
*G06N 3/08* (2006.01)
*G06N 7/00* (2006.01)
*G06F 40/232* (2020.01)

(52) U.S. Cl.
CPC ......... *G06F 40/284* (2020.01); *G06F 40/232* (2020.01); *G06N 3/08* (2013.01); *G06N 7/005* (2013.01); *G06N 20/00* (2019.01); *H04L 67/18* (2013.01)

(58) Field of Classification Search
CPC ......... G06N 20/00; G06N 7/005; H04L 67/18
See application file for complete search history.

(56) References Cited

U.S. PATENT DOCUMENTS

| 9,501,466 | B1* | 11/2016 | Namjoshi | G06F 40/279 |
| 2007/0067171 | A1* | 3/2007 | Mahajan | G10L 15/063 |
| | | | | 704/256.2 |
| 2009/0248605 | A1* | 10/2009 | Mitchell | G06F 40/205 |
| | | | | 706/52 |
| 2016/0147943 | A1* | 5/2016 | Ash | G06N 20/00 |
| | | | | 705/3 |

OTHER PUBLICATIONS

Huang, Z., et al., Bidirectional LSTM-CRF Models for Sequence Tagging, arXiv e-prints, Aug. 2015, 10 pages.

(Continued)

*Primary Examiner* — Abul K Azad
(74) *Attorney, Agent, or Firm* — Knobbe, Martens, Olson & Bear, LLP

(57) ABSTRACT

Generally described, one or more aspects of the present application correspond to a machine learning address normalization system. A system of deep learning networks can normalize the tokens of a free-form address into an address component hierarchy. Feature vectors representing various characters and words of the address tokens can be input into a bi-directional long short term memory network (LSTM) to generate a hidden state representation of each token, which can be individually passed through a softmax layer to generate probabilistic values of the token being each of the components in the address hierarchy. Thereafter, a conditional random field (CRF) model can select a particular address component for each token by using learned parameters to optimize a path through the collective outputs of the softmax layer for the tokens. Thus, the free-form address can be normalized to determine the values it contains for different components of a specified address hierarchy.

20 Claims, 7 Drawing Sheets

(56) References Cited

OTHER PUBLICATIONS

Lample, G., et al., Neural Architectures for Named Entity Recognition, Proceedings of the Conference of the North American Chapter of the Association for Computational Linguistics: Human Language Technologies, Jun. 12-17, 2016, San Diego, California, pp. 260-270.

Lau, S., Learning Rate Schedules and Adaptive Learning Rate Methods for Deep Learning, 8 pages, https://towardsdatascience.com/learning-rate-schedules-and-adaptive-learning-rate-methods-for-deep-learning, Accessed Dec. 4, 2018.

Pennington, J., et al., GloVe: Global Vectors for Word Representation, Proceedings of the Conference on Empirical Methods in Natural Language Processing, Oct. 25-29, 2014, Doha, Qatar, pp. 1532-1543.

Tracking Progress in Natural Language Processing, 4 pages, https://github.com/sebastianruder/NLP-progress. Accessed Dec. 4, 2018.

Tracking Progress in Natural Language Processing, 4 pages, https://nlpprogress.com/, Accessed Dec. 4, 2018.

\* cited by examiner

ADDRESS NORMALIZATION USING DEEP LEARNING AND ADDRESS FEATURE VECTORS

BACKGROUND

Addresses and the locations they represent are important for any application dealing with geospatial data (place search, transportation, on-demand/delivery services, check-in, reviews). However, even the simplest addresses are packed with local conventions, abbreviations, and context, making them difficult to index and query with traditional full-text search engines. For example, addresses are often presented in different forms that may contain various abbreviations of words, such as NW for North West or ST for street. Address normalization is the process of analyzing addresses and modifying them if necessary so that they are spelled and formatted correctly. For example, address normalization can fix spelling errors, standardize abbreviations, and format capitalization to match preferred formatting. Normalization of addresses can provide a number of benefits, for example reducing costs on returned and undeliverable mail and increasing accuracy in geocoding (e.g., translating the address into coordinates of a physical location on the Earth).

DETAILED DESCRIPTION

Figure 1:
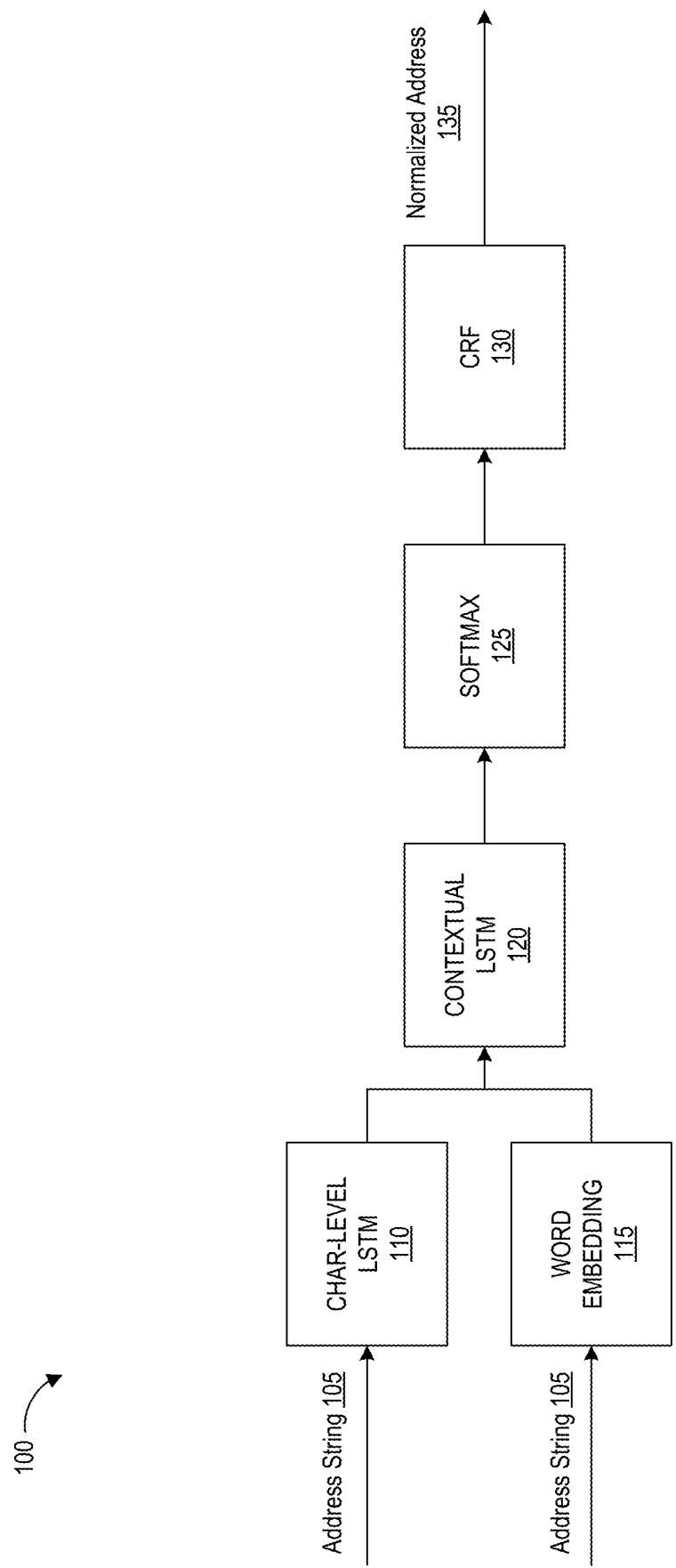
FIG. 1 depicts a graphical overview of an example machine learning address normalization system, as described herein.

Generally described, one or more aspects of the present application correspond to artificial intelligence systems and techniques that use machine learning (ML) to normalize address data. As described above, address normalization can provide benefits for a number of downstream applications. However, variability in address notation, for example resulting from spelling errors, acronyms, varying ordering of address components, or missing address components, can make it difficult to normalize addresses. For example, the same address can be written as "123 Example St. #1," "Unit 1, 123 Example Street," or "Attn: Jane Doe, 123 Example Street, Unit 1." These different versions of the same address exhibit different orderings of the street address and unit identifier components, different ways of writing "street," different ways of identifying the unit, and the last version also includes the name of an individual. Many existing approaches to address normalization are rule-based, and thus can only handle well defined and structured addresses, and face difficulty in normalizing variations such as the above example. Further, rule-based systems do not scale well to other geographies that have different address conventions and use different languages.

The above described problems, among others, are addressed in some embodiments by the disclosed ML system that can parse free-form, user-entered addresses into a normal form (e.g., following a specified hierarchy of address components). Beneficially, the disclosed ML address normalization system can take as input a free-form address string, analyze the string to classify each token according to a hierarchy of address components, and output reformatted address data with labeled components. An address string refers to a sequence of letters, numbers, punctuation, and/or other characters that represents an address. A free-form address string may be entered by a user into one or more input fields, for example of a graphical user interface. Tokens can be identifiable sub-components of an address string, for example groupings of letters, numbers, and/or other characters separated by white space or other punctuation. For example, tokens of an address string can be identified by isolating the first token and the second token from a specified punctuation between the first token and the second token in the address string. Address components include, for example, building-number, street descriptors, city, state, and zip code. The particular components of an address learned by the ML system can vary based on the desired region, and thus the disclosed techniques are beneficially agnostic as to any language or region.

Specifically, the disclosed techniques use a system of deep learning networks to normalize the tokens of a free-form address into the hierarchy of address components. Feature vectors representing various characters and words of the address tokens can be input into a bi-directional long short term memory network (LSTM) to generate a hidden state representation of each token. These hidden state token representations can be individually passed through a softmax layer. As those skilled in the art will recognize, a softmax layer is typically implemented before an output layer in order to assign a probability to each class of a multi-class problem. Accordingly, in the present case, the softmax layer is used to assign a probability to each token of being each of the components in the address hierarchy. Thereafter, a conditional random field (CRF) model can select a particular address component for each token by using learned parameters to optimize a path through the collective outputs of the softmax layer for the tokens. The CRF model can assign each token to a single address component (e.g., Park=street name, Avenue=street type), but multiple tokens can be assigned to any given address component (e.g., Old=street name, Kent=street name, Road=street type). Thus, the disclosed ML system can receive input of a free-form address and determine what the values are for the different address components by classifying individual tokens, in order to generate a normalized version of the address. This ML architecture—in which LSTM token embeddings are provided through a softmax layer to a CRF model—can be trained and applied for normalizing free-form addresses in any language and that follow any region-specific address component hierarchy.

Addresses normalized as described herein can be more suitable for machine comparison and indexing, and more accurately translated to specific geocodes, than their free-form counterparts. A geocode is the latitude and longitude of a physical address. Geocodes generated from addresses normalized as described herein can be used in a wide range of applications. For example, geocoded addresses can be used for analysis of spatial patterns in data, navigational directions planning, and efficient route mapping (e.g., determining a delivery route to a number of locations that minimizes resource usage). Accurately resolving addresses to the correct geocodes can help reduce waste and costs associated with misdelivered or undeliverable mail and packages. Accordingly, in some implementations the disclosed address normalization can increase the efficiency of delivery route planning.

As would be appreciated by one of skill in the art, the use of a ML system for address normalization, as disclosed herein, represents a significant technological advance over prior implementations. Specifically, the disclosed ML address normalization system can reformat a free-form address string into data representing the address that is more easily machine-readable for downstream processing applications. Previous normalization approaches are typically completely rule-based, and thus result in many failures when free-form addresses do not follow a well-defined structure. In contrast, the disclosed deep learning techniques are able to handle a wide range of variations and idiosyncrasies in free-form address entry. Further, the disclosed approaches provide memory efficiencies over prior implementations by using the same trained model across a number of addresses, which removes the need to store and query large dictionaries of words. As such, the embodiments described herein represent significant improvements in computer-related technology.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Overview of Example Address Normalization ML Systems and Techniques

FIG. 1 depicts a graphical overview of an example ML address normalization system 100, as described herein. The ML address normalization system 100 includes several components including a char-level LSTM 110, a word embedding model 115, a contextual LSTM 120, and a CRF model 130. These ML components cooperate to transform free-form address string data 105 into normalized address data 135 that specifies the values of different address components provided by the free-form address string data 105. Though not illustrated, the ML address normalization system 100 can also include a component that takes the address string data 105 and parses it into individual tokens, for example, based on recognizing strings of characters separated by commas, white spaces, or both. Tokens may be individual words (e.g., "Park," "Avenue") or other character strings (e.g., "#1", "No.G8") that form a discrete part of the address string.

The word embedding 115 model can be trained to generate embeddings of tokens. A word embedding refers to a mapping of a token to a vector of numbers in a low-dimensional space relative to the vocabulary size. Word embeddings can meaningfully represent the context of tokens in a set of tokens corresponding to addresses of a particular region, as well as the relation of tokens to one another (e.g., semantic and syntactic similarity). For example, the distance between the vectors of related words in the vector space will be less than the distance between unrelated words. Some implementations can use Global Vectors (GloVe) embeddings, which use an unsupervised learning algorithm for obtaining vector representations of a specified vocabulary of tokens. Training can be performed on aggregated global token-token co-occurrence statistics from a corpus of address data, for example address data from a particular region. Some implementations may use training data from a particular city. Other types of word embeddings can be used in other implementations, for example, neural network based word2vec models, one hot encodings, and other suitable supervised and unsupervised learning algorithms. One of skill in the art will recognize that such embeddings are known in the art and thus, need not be further described herein.

Figure 2A:
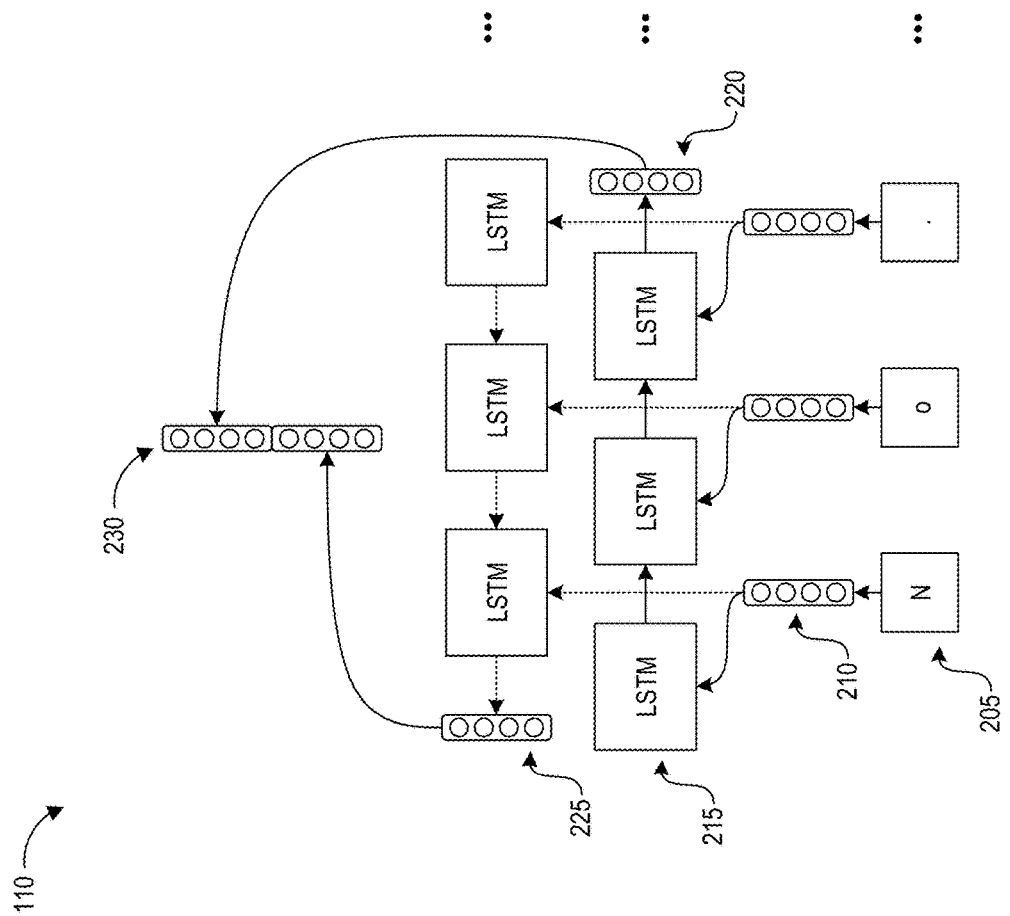
FIGS. 2A-2D depicts additional details of the machine learning address normalization system of FIG. 1.

The char-level LSTM 110, discussed in further detail with respect to FIG. 2A, can be trained to generate character-level embeddings of tokens. The word embedding model 115 can typically only generate vectors for tokens that it has seen in its training vocabulary. Character embeddings can improve model performance, as every token can be converted into a vector, even if it is out of vocabulary (e.g., a new word, abbreviation, or misspelling).

The outputs of the char-level LSTM 110 and word embedding model 115 can be combined as input to the contextual LSTM 120. The contextual LSTM 120 can take in this input for each token in the address string 105 and return a hidden state representation of each token, which is a learned representation of the salient features of the token with respect to the classification into the address component hierarchy. The contextual LSTM 120 is described in further detail with respect to FIG. 2B.

The hidden state representation of each token can be individually passed through the softmax layer 125. The output of the softmax layer 125 can have the same dimensionality as the number of address components in the hierarchy, such that it represents the probability of the token belonging to each address component. In the United States, for instance, the United States Postal Service (USPS) defines addresses as sequences of hierarchical address components that include: the building-number, the street-direction prefix, the street-name, the street-name suffix, the street-direction suffix, the unit-number prefix, the unit-number, the city, and the state. The underlying hierarchy places the state at the top, followed by the city, the street descriptor components, the building number, and, finally, the unit descriptor components. As another example of an address component hierarchy, the following may be used for addresses in India:

1) B-HUN—Beginning of a house number.
2) I-HUN—Inside a house number.
3) B-BLD—Beginning of a building name.
4) I-BLD—Inside a building name.
5) B-CMP—Beginning of a company name.
6) I-CMP—Inside a company name.
7) B-SUBL—Beginning of a sub-locality.
8) I-SUBL—Inside a sub-locality name.
9) B-LOC—Beginning of a locality.
10) I-LOC—Inside a locality name.
11) B-ROAD—Beginning of a road name.
12) I-ROAD—Inside a road name.
13) B-LNDM—Beginning of a landmark.
14) I-LNDM—Inside a landmark name.
15) O—Assign this tag to everything which does not belong to the above tags.

For tagging addresses, some implementations can use Inside-Outside-Beginning tagging—IOB format, a tagging format for tagging tokens in a chunking task in computational linguistics (e.g., Named-entity-recognition). The "B-" prefix before a tag indicates that the tag is the beginning of a chunk, and an "I-" prefix before a tag indicates that the tag is inside a chunk. The "B-" tag is used only when a tag is followed by a tag of the same type without "O" tokens between them. An "O" tag indicates that a token belongs to no chunk.

The output of the softmax layer can include a probabilistic value corresponding to each component in the hierarchy.

The contextual LSTM 120, softmax layer 125, and CRF model 130 can be trained to predict, for each token, to which address component the token belongs. In some embodiments, these components can be trained as a system rather than as individual models, that is, using the same set of input and expected output data. Labeled training data can be annotated by humans familiar with the addresses and their associated address component label tags. This can be done for any predetermined address component hierarchy, making the model robust to different languages and different regional address conventions.

The ML system 100 can implement multiple techniques to make use of neighbor tag information in predicting current tags. The first is to predict a distribution of tags for each time step and then use beam like decoding to find an optimal tag sequence. The second technique is to focus on sentence level instead of individual positions, thus leading to conditional random fields. In this implementation, the CRF model 130 can be trained to select a particular address component for each token by using learned parameters to optimize a path through the collective outputs of the softmax layer for the tokens. The CRF model 130 is described in further detail with respect to FIG. 2D. The output of the CRF model 130 is the normalized address 135 corresponding to the address string 105, where each token is categorized as one of the components of the address hierarchy.

As an example of an address that can be normalized into the second example hierarchy, consider the following: "# CHEMTEX CONSULTING OF INDIA LTD 2nd Floor, Prestige Terminus 2, Old airport arrival road." The individual tokens of this address can be normalized as follows: CHEMTEX:B-CMP; CONSULTING:I-CMP; OF:I-CMP; INDIA:I-CMP; LTD:I-CMP; 2nd:B-HUN; Floor:I-HUN; Prestige:B-BLD; Terminus:I-BLD; 2:I-BLD; Old:B-ROAD; airport:I-ROAD; arrival:I-ROAD; road:I-ROAD.

FIGS. 2A-2D depicts additional details of the machine learning address normalization system of FIG. 1. Specifically, FIG. 2A depicts an example of the char-level LSTM 110. Recurrent neural networks (RNN) can maintain a memory based on historical information, which enables the model to predict the current output conditioned on long distance-based features. The disclosed implementations can use LSTM networks, which are a type of RNN in which the hidden layer updates are replaced by purpose-built memory cells. As a result, LSTMs are well suited for finding and exploiting long-range dependencies in the data.

The char-level LSTM 110 is shown with the example token "No.G8". In the illustrated example, the example token includes "No.G8," although only the first three characters of the token (i.e., "N", "o", and ".") are shown for simplicity of the figure. As shown, each character 205 in the token is input into two separate LSTM memory cells 215— one that feeds its output forward (e.g., to a memory cell that also receives a later character in the token, shown by the solid lines) and one that feeds its output backward (e.g., to a memory cell that also receives an earlier character in the token, shown by the dotted lines). As such, the illustrated implementation uses a bi-direction LSTM, which analyzes sequences both forward and backward in order to generate the resultant embedding.

A character 205 is converted into a vector 210 suitable for input into an LSTM cell. Each character vector 210 is input separately into both a forward LSTM cell and a backward LSTM cell. This results in a first vector 220 representing the forward analysis of the characters in the token and a second vector 225 representing the backward analysis of the characters in the token, which are combined (e.g., concatenated) in order to produce the character level embedding 230.

Figure 2B:
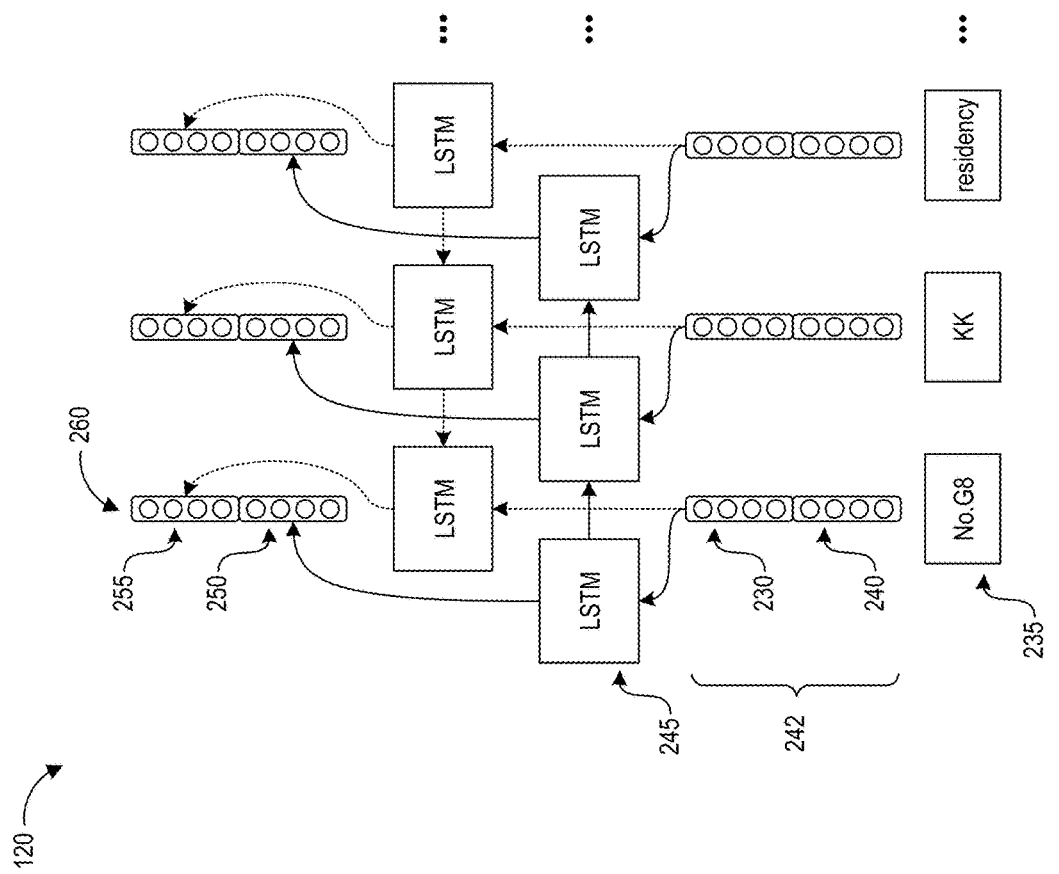

FIG. 2B illustrates an example of the contextual LSTM 120. Similar to the char-level LSTM 110, the contextual LSTM 120 can also use a bi-directional LSTM. The contextual LSTM 120 takes as input a combined vector 242 representing both the character level embedding 230 output by the char-level LSTM 110 and a word embedding 240 output by the word embedding model 115. Each combined vector 242 is separately input into two separate LSTM memory cells 245—one that feeds its output forward (e.g., to a memory cell that also receives a later token in the address string, shown by the solid lines) and one that feeds its output backward (e.g., to a memory cell that also receives an earlier token in the address string, shown by the dotted lines). In the illustrated example, the address string includes "No.G8, KK residency apartment LB shivalingaiah road, Jeevan bheema nagar," although only the first three tokens are shown for simplicity of the figure. It will be appreciated that the number of LSTM blocks in both the char-level LSTM 110 and contextual LSTM 120 can be set to match the number of characters or tokens in the input data.

The forward analysis of the address string tokens results in a first vector 250, and the backward analysis of the address string tokens results in a second vector 255. These can be combined (e.g., concatenated) in order to produce the hidden state representation 260. As shown in FIG. 2B, the hidden state representation 260 can be generated separately for each token based on the outputs of the forward and backward LSTM cell that receive input representing that token.

Figure 2C:
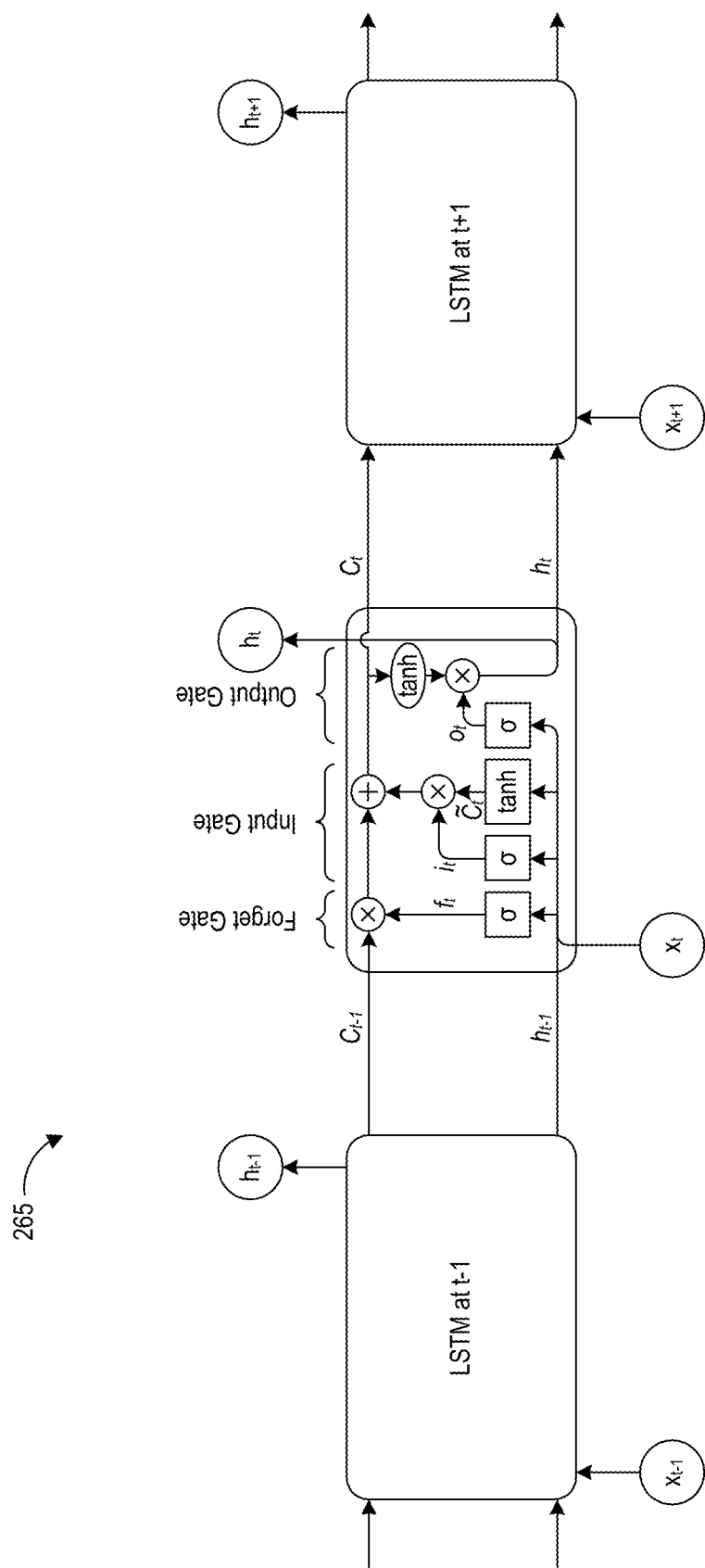

FIG. 2C depicts an example LSTM memory cell 265 that can be used for the memory cells 215, 246 of the char-level LSTM 110 and contextual LSTM 120 of FIG. 1. It will be appreciated that the parameters of the LSTM block can be trained separately for the char-level LSTM 110 and contextual LSTM 120. LSTM memory cells are a type of recurrent neural network (RNN), and as such they form networks with "loops" in them that allow information to persist from use to use. A RNN (and LSTM) can be thought of as multiple copies of the same trained cell, each passing a message to a successor. To illustrate this concept, FIG. 2C illustrates the same LSTM memory cell 265 at time t as well as this same cell at times t−1 and t+1.

The example LSTM memory cell 265 receives the output cell state $C_{t-1}$ and output vector hidden state $h_{t-1}$ from itself at a previous time step, thus retaining values of prior states. The example LSTM memory cell 265 also receives input $x_t$, which represents either an input vector of a character in a token (for the char-level LSTM 110) or a combination of the character embedding 230 and word embedding 240 of the token (for the contextual LSTM 120).

As shown in FIG. 2C, the LSTM memory cell 265 includes cell vector and three multiplicative gates which regulate the state of the cell. The cell vector encodes the knowledge of the inputs that have been observed up to that time step, the forget gate controls whether the old information should be retained or forgotten, the input gate regulates whether new information should be added to the cell state, and the output gate controls the flow of the cell state to the output. In one implementation, the LSTM memory cell can be implemented as the following:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} + i_t \tan h(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tan h(c_t),$$

where σ is the logistic sigmoid function, and i, f, o and c are the input gate, forget gate, output gate and cell vectors (respectively), all of which can be the same size as the hidden vector h. The weight matrix subscripts have the same meaning as the name suggests. For example, $W_{hi}$ is the hidden-input gate matrix, $W_{xo}$ is the input output gate matrix, and the like.

Figure 2D:
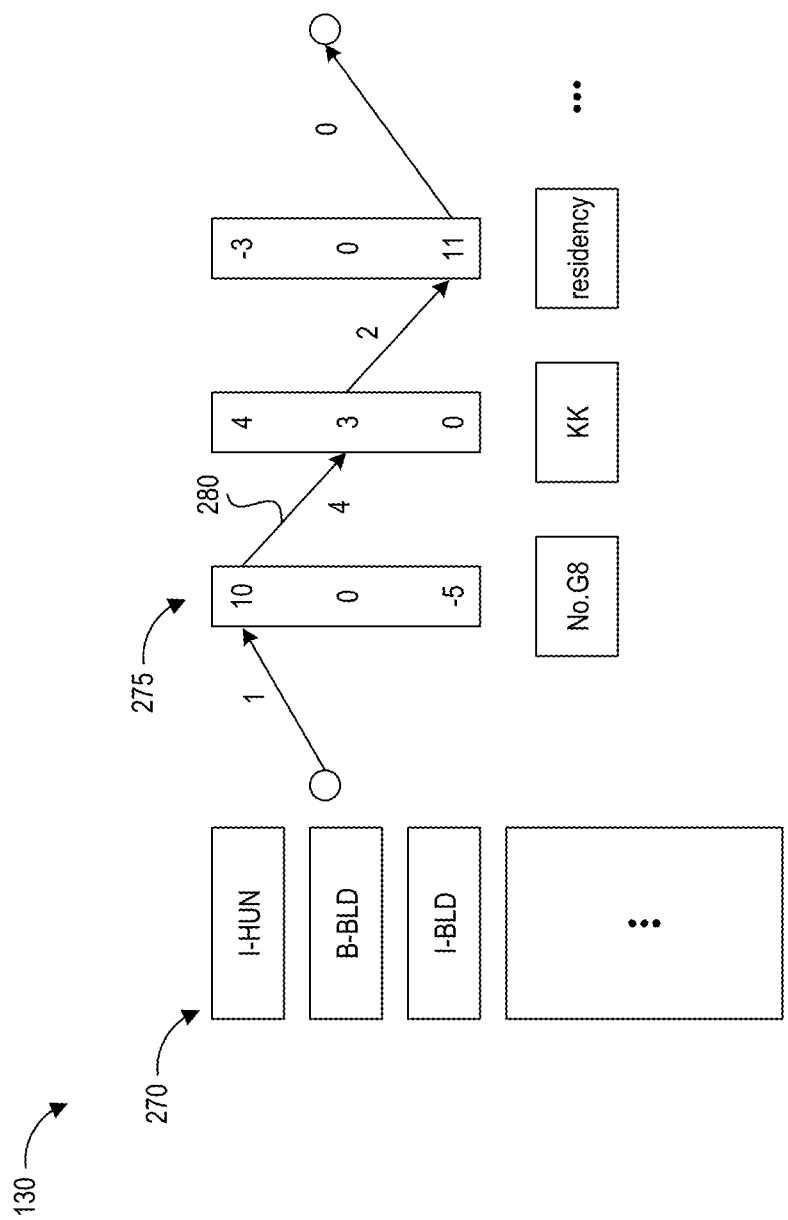

FIG. 2D depicts an example implementation of the trained CRF model 130 on the output of the contextual LSTM 120 for the tokens "No.G8", "KK", and "residency". FIG. 2D also depicts an example representation 275 of the output of the softmax layer 125, which includes values representing probabilities that the token belongs to each address component. As shown, the CRF 130 model identifies pathways 280 between the different softmax layer outputs based on its learned parameters, and the locations of these pathways within the softmax layer outputs 275 indicate to which address component the corresponding token should be assigned. The address component may not have the highest probability among the values in the softmax layer output, as shown for the token "KK," because it is determined based on learned parameters of the CRF model. In this example, the complete address string was categorized into the Indian address component hierarchy as follows: No.G8:I-HUN; KK:B-BLD; residency:I-BLD; apartment:I-BLD; LB:B-ROAD; shivalingaiah:I-ROAD; road:I-ROAD; Jeevan:B-LOC; bheema:I-LOC; nagar:I-LOC.

Figure 3:
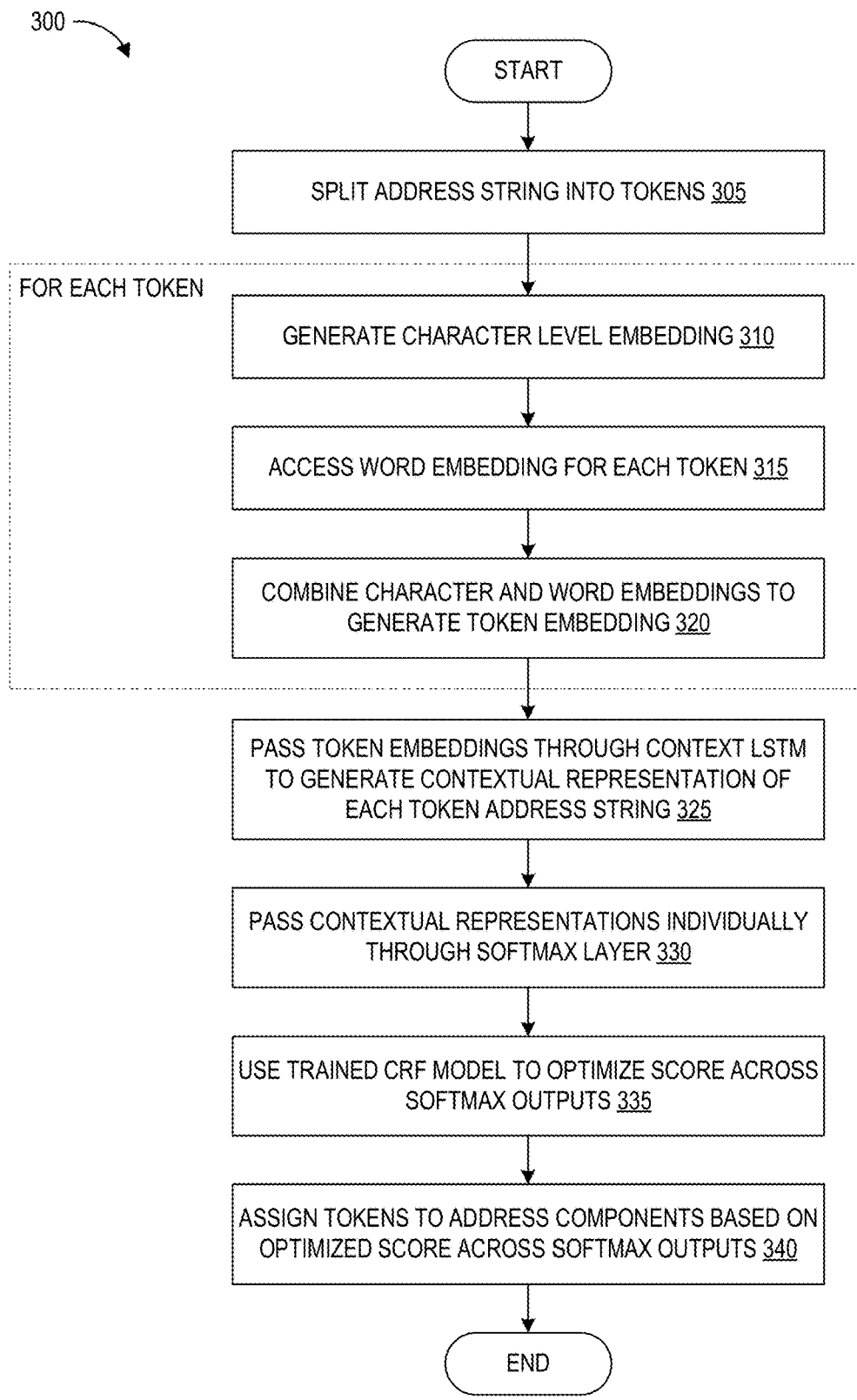
FIG. 3 depicts a flowchart of an example process for performing address normalization using the machine learning system of FIG. 1.

FIG. 3 depicts a flowchart of an example process 300 for performing address normalization using the ML address normalization system 100. At block 305, the address string 105 can be split into tokens, for example by identifying continuous strings of characters separated by designated punctuation mark(s).

At block 310, the char-level LSTM 110 can generate a character level embedding, for example, based on forward and backward analysis of the characters in a token using a bi-directional LSTM, as described above with respect to FIG. 2A. At block 315, the system 100 can access a word embedding for each token. As described above, a machine learning model can be used to map tokens in a specified vocabulary to a low-dimensional vector space in order to generate their word embeddings. These may be generated in advance of analyzing a particular address and looked up as needed, or the trained model may be provided with input of tokens from an input address string. It will be appreciated that the trained model may return a vector of all zeros or a null result for tokens that were not in the training vocabulary, and thus the character level embedding can beneficially provide some context about such tokens. Blocks 310 and 315 can be performed in sequence or in parallel.

At block 320, the word embedding and character embedding generated at blocks 310 and 315 can be combined (for example, concatenated) into a single token embedding for downstream use in the ML address normalization system 100. As shown by the dashed box around blocks 310-320, these blocks can be repeated for each token in the address string to generate a corresponding number of token embeddings.

At block 325, the token embeddings can be passed through the contextual LSTM 120, for example, as described above with respect to FIG. 2B. This can generate a hidden state representation of each token, which can be individually passed through the softmax layer at block 330 to generate values representing the likelihood of particular tokens belonging to each component in the address hierarchy.

At block 335, the CRF model 130 can analyze the softmax layer outputs using its learned parameters to assign each token to a particular address component in the hierarchy. At block 340, the system 100 assigns the tokens to address components based on the optimized score across softmax layer outputs as determined by the CRF model 130. These tokens can be combined in the order in which they appear in the address string to form the normalized address data. As described above, each token is assigned to a single address component, but a given address component may have multiple tokens assigned to it, and certain address components may not have any assigned tokens. One benefit of the disclosed techniques over rule-based systems is that no processing time is wasted looking for values for address components that have no assigned tokens, since the assigning is performed using deep learning.

Using the process 300, free-form address data can be converted to a format more suitable for downstream machine analysis. For example, some implementations can translate the normalized address into a particular geocode. This can be used for more efficient route planning. Accordingly, the process 300 can additionally include steps for translating the normalized address into a geocode, determining a route based on the geocode, and sending the route to a user device.

Execution Environment

Figure 4:
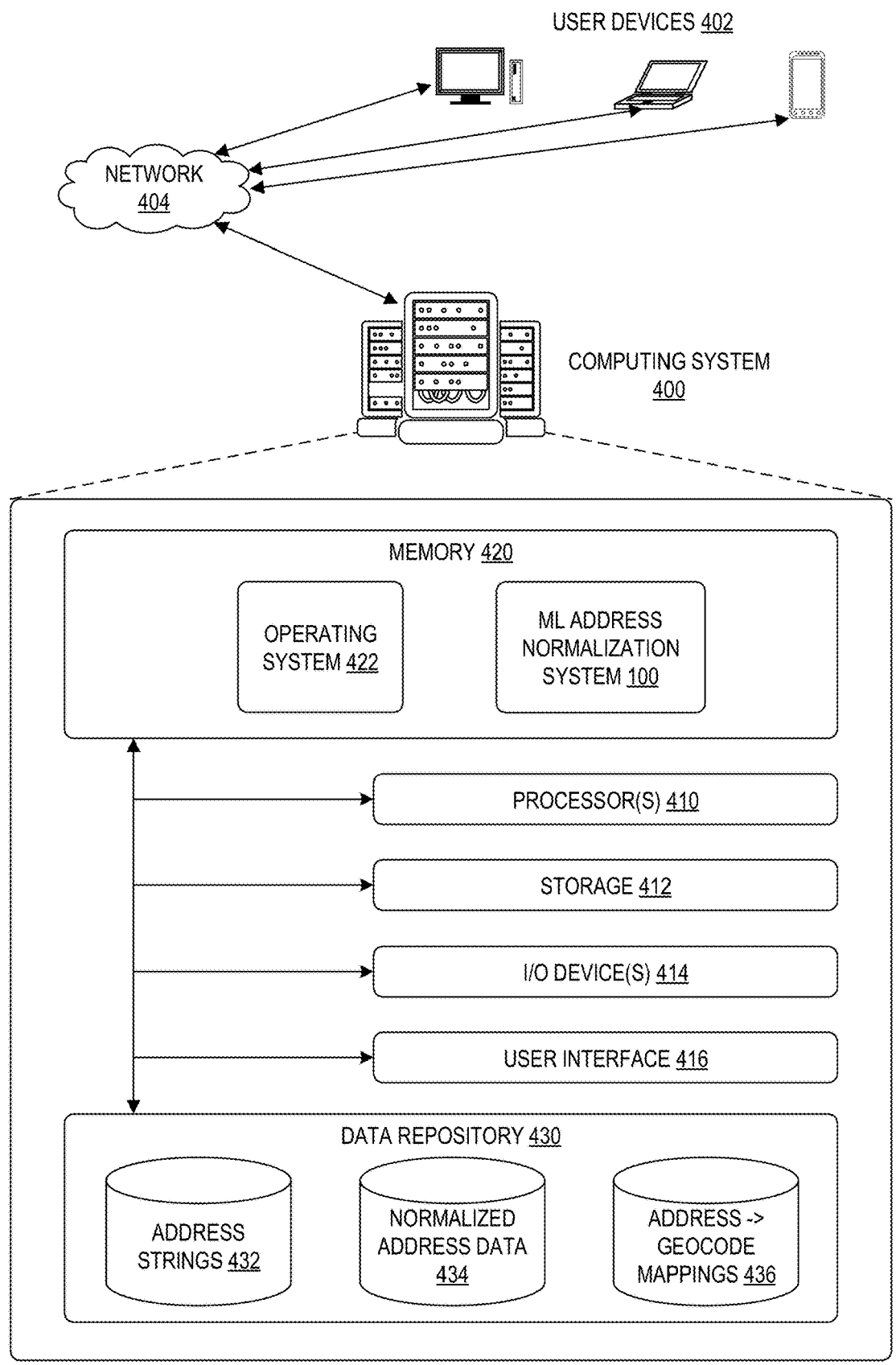
FIG. 4 illustrates a schematic block diagram of an example interactive computing environment for the machine learning address normalization system of FIG. 1.

FIG. 4 is a block diagram of an illustrative computing system 400 configured to implement the above-described processes to train and implement an address normalization system 100, as described herein. The architecture of the interactive computing system 400 includes a memory 420 in communication with a processor 410, which can be in direct communication with one another or distributed among computing devices within a networked computing system and in communication with each other. Components used for the architecture may depend at least in part upon the type of network and/or environment selected.

As depicted interactive computing system 400 may include one or more computers, perhaps arranged in a cluster of servers or as a server farm. The memory and processors that make up these computers may be located within one computer or distributed throughout many computers (including computers that are remote from one another) as detailed herein. These servers may be configured to intelligently self-maintain ML systems, as described herein.

The interactive computing system 400 may include at least one memory 420 and one or more processing units (or processor(s)) 410. The memory 420 may include more than one memory and may be distributed throughout the interactive computing system 400. The memory 420 may store program instructions that are loadable and executable on the processor(s) 410 as well as data generated during the execution of these programs. Depending on the configuration and type of memory, the memory 420 may be volatile (such as RAM and/or non-volatile (such as read-only memory ("ROM"), flash memory, or other memory). In some examples, the memory 420 may include multiple different types of memory, such as static random access memory ("SRAM"), dynamic random access memory ("DRAM"), or ROM.

The memory can store the program instructions as a number of modules that configure processor(s) 410 to perform the various functions described herein, for example operating system 422 and ML address normalization system 100. The memory 420 may include operating system 422 for interacting with the interactive computing system 400.

The processor 410 includes one or more general purpose computers, dedicated microprocessors, graphics processors, or other processing devices capable of communicating electronic information. Examples of the processor 410 include one or more application-specific integrated circuits ("ASICs"), for example ASICs purpose built for machine learning training and/or inference, field programmable gate arrays ("FPGAs"), digital signal processors ("DSPs") and any other suitable processors. The processor 410 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 400 may also include additional storage 412, which may include removable storage and/or non-removable storage. The additional storage 412 may include, but is not limited to, magnetic storage, optical disks, and solid state storage. The disk drives and their associated computer-readable media may provide non-volatile storage of computer-readable instructions, data structures, program modules, and other data for the computing devices. The memory 420 and the additional storage 412, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The interactive computing system 400 may also include input/output (I/O) device(s) and/or ports 414, such as for enabling connection with a keyboard, a mouse, a pen, a voice input device, a touch input device, a display, speakers, a printer, or other I/O device.

The interactive computing system 400 may also include a user interface 416. The user interface 416 may be provided over the network 404 to user devices 402 and utilized by a user to access portions of the interactive computing system 400. In some examples, the user interface 416 may include a graphical user interface, web-based applications, programmatic interfaces such as application programming interfaces ("APIs"), or other user interface configurations. The user interface 416 can display normalized address data output by the ML address normalization system 100, and in some implementations can be used to output delivery routes planned based on geocoding normalized address data.

The interactive computing system 400 may also include a data store 430. In some examples, the data store 430 may include one or more data stores, databases, data structures, or the like for storing and/or retaining information associated with the interactive computing system 400. Thus, the data store 430 may include data structures, such as address strings data repository 432, normalized address data repository 434, and address to geocode mappings data repository 436. The address strings data repository 432 includes one or more computer storage devices storing free-form address strings for input into the ML address normalization system 100. The normalized address data repository 434 includes one or more computer storage devices storing normalized address data output by the ML address normalization system 100. As described herein, a normalized address can have an address component associated with each token, such that normalized address data includes values for at least some address components in a pre-specified address component hierarchy. The geocode mappings data repository 436 includes one or more computer storage devices storing mappings between (i) one or both of a free-form address string and its corresponding normalized counterpart, and (ii) a geocode identified based on the normalized counterpart.

The interactive computing system 400 can communicate over network 404 with user devices 402. The network 404 can include any appropriate network, including an intranet, the Internet, a cellular network, a local area network or any other such network or combination thereof. User devices 402 can include any network-equipped computing device, for example desktop computers, laptops, smartphones, tablets, e-readers, gaming consoles, and the like. Users can access the interactive computing system 400 to receive route planning information generated based on normalized addresses, in some implementations.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The disclosed processes may begin in response to an event, such as on a predetermined or dynamically determined schedule, on demand when initiated by a user or system administer, or in response to some other event. When the process is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks and modules described in connection with the embodiments disclosed herein can be implemented or performed by a machine, such as a processor device, a DSP, an ASIC, an FPGA, or other programmable logic device, discrete gate or transistor logic, discrete hardware components, or any combination thereof designed to perform the functions described herein. Moreover, the various illustrative logical blocks, modules, routines, and algorithm steps described in connection with the embodiments disclosed herein can be implemented as electronic hardware (e.g., ASICs or FPGA devices), computer software that runs on computer hardware, or combinations of both. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
    a memory storing instructions for implementing a machine learning (ML) address normalization system including at least one long short term memory (LSTM) model and a conditional random fields (CRF) model; and
    one or more processors in communication with the memory, the one or more processors configured by the instructions to at least:
        access an address string including at least a first token and a second token;
        pass the first token through the at least one LSTM model to generate a first hidden state representation of the first token;
        use the first hidden state representation of the first token to generate a first set of probabilities including, for each address component of a plurality of address components in a specified hierarchy of address components, a probability that the first token belongs to the address component;
        pass the second token through the at least one LSTM model to generate a second hidden state representation of the second token;
        use the second hidden state representation of the second token to generate a second set of probabilities including, for each address component of the plurality of address components, a probability that the second token belongs to the address component;

analyze the first and second sets of probabilities using the CRF model to assign the first token to a first address component of the plurality of address components and to assign the second token to a second address component of the plurality of address components; and generate normalized address data indicating that the first token is a value of the first address component and the second token is a value of the second address component.

2. The system of claim 1, further comprising:
a word embedding model trained to generate word embeddings of input tokens;
wherein the at least one LSTM model includes a first LSTM model trained to generate character level embeddings of tokens and a second LSTM model trained to generate hidden state representations of tokens; and
wherein the one or more processors are configured by the instructions to at least:
use the first LSTM model to generate a character level embedding of the first token;
use the word embedding model to generate a word embedding of the first token; and
pass a combination of the character level embedding and the word embedding through the second LSTM model to generate the hidden state representation of the first token.

3. The system of claim 1, wherein the specified hierarchy of address components corresponds to a particular region, wherein the ML address normalization system includes a parameter learned based at least in part on training data including a plurality of addresses from the particular region, and where the address string represents a physical location within the particular region.

4. The system of claim 1, wherein the one or more processors are configured by the instructions to at least:
resolve the normalized address data to a geocode; and
generate a delivery route plan based at least in part on the geocode.

5. A computer-implemented method comprising:
accessing an address string including at least a first token and a second token;
passing the first token through at least one sequence analysis model to generate a first hidden state representation of the first token;
using the first hidden state representation of the first token to generate a first set of probabilities including, for each address component of a plurality of address components in a specified hierarchy of address components, a probability that the first token belongs to the address component;
passing the second token through the at least one sequence analysis model to generate a second hidden state representation of the second token;
using the second hidden state representation of the second token to generate a second set of probabilities including, for each address component of the plurality of address components, a probability that the second token belongs to the address component;
based at least in part on the first and second sets of probabilities, assigning the first token to a first address component of the plurality of address components and assigning the second token to a second address component of the plurality of address components; and generating normalized address data indicating that the first token is a value of the first address component and the second token is a value of the second address component.

6. The computer-implemented method of claim 5, further comprising:
optimizing a path through the first and second sets of probabilities using a conditional random field (CRF) model;
assigning the first token to the first address component based at least in part on a location of the path through the first set of probabilities; and
assigning the second token to the second address component based at least in part on a location of the path through the first set of probabilities.

7. The computer-implemented method of claim 6, wherein the specified hierarchy of address components corresponds to a particular region, the computer-implemented method further comprising training parameters of the at least one sequence analysis model and the CRF model based at least in part on training data including a plurality of addresses from the particular region.

8. The computer-implemented method of claim 5, wherein the first address component and the second address component are the same address component in the specified hierarchy of address components, the computer-implemented method further comprising:
combining the first and second tokens into a string; and
setting a value of the same address component to the string to generate the normalized address data.

9. The computer-implemented method of claim 5, further comprising determining the first address component and the second address component as different address components in the specified hierarchy of address components.

10. The computer-implemented method of claim 5, wherein the at least one sequence analysis model includes a first LSTM model trained to generate character level embeddings of tokens and a second LSTM model trained to generate hidden state representations of tokens, the computer-implemented method further comprising:
using a word embedding model trained to generate a word embedding of the first token;
using the first LSTM model to generate a character level embedding of the first token; and
passing a combination of the character level embedding and the word embedding through the second LSTM model to generate the hidden state representation of the first token.

11. The computer-implemented method of claim 10, wherein the first LSTM model is a bi-directional LSTM, the computer-implemented method further comprising generating the character level embedding as a combination of a first vector generated by analyzing characters of the first token in a forward order and a second vector generated by analyzing the characters of the first token in a backward order.

12. The computer-implemented method of claim 5, further comprising:
resolving the normalized address data to a geocode; and
generating a delivery route plan based at least in part on the geocode.

13. The computer-implemented method of claim 5, further comprising isolating the first token and the second token by identifying a specified punctuation between the first token and the second token in the address string.

14. A non-transitory computer-readable medium comprising computer-executable instructions that, when executed on a computing system, cause the computing system to perform operations comprising:
- accessing an address string including at least a first token and a second token;
- passing the first token through at least one sequence analysis model to generate a first output representing the first token;
- using the first output to generate a first set of probabilities including, for each address component of a plurality of address components in a specified hierarchy of address components, a probability that the first token belongs to the address component;
- passing the second token through the at least one sequence analysis model to generate a second output representing the second token;
- using the second output to generate a second set of probabilities including, for each address component of the plurality of address components, a probability that the second token belongs to the address component;
- based at least in part on the first and second sets of probabilities, assigning the first token to a first address component of the plurality of address components and assigning the second token to a second address component of the plurality of address components; and
- generating normalized address data indicating that the first token is a value of the first address component and the second token is a value of the second address component.

15. The non-transitory computer-readable medium of claim 14, the operations further comprising:
- optimizing a path through the first and second sets of probabilities using a conditional random fields (CRF) model;
- assigning the first token to the first address component based at least in part on a location of the path through the first set of probabilities; and
- assigning the second token to the second address component based at least in part on a location of the path through the first set of probabilities.

16. The non-transitory computer-readable medium of claim 15, wherein the specified hierarchy of address components corresponds to a particular region, the operations further comprising training parameters of the at least one sequence analysis model and the CRF model based at least in part on training data including a plurality of addresses from the particular region.

17. The non-transitory computer-readable medium of claim 14, wherein the first address component and the second address component are the same address component in the specified hierarchy of address components, the operations further comprising:
- combining the first and second tokens into a string; and
- setting a value of the same address component to the string to generate the normalized address data.

18. The non-transitory computer-readable medium of claim 14, wherein the at least one sequence analysis model includes a first LSTM model trained to generate character level embeddings of tokens and a second LSTM model trained to generate hidden state representations of tokens, the operations further comprising:
- using a word embedding model trained to generate a word embedding of the first token;
- using the first LSTM model to generate a character level embedding of the first token; and
- passing a combination of the character level embedding and the word embedding through the second LSTM model to generate the hidden state representation of the first token.

19. The non-transitory computer-readable medium of claim 14, the operations further comprising:
- resolving the normalized address data to a geocode; and
- generating a delivery route plan based at least in part on the geocode.

20. The non-transitory computer-readable medium of claim 14, the operations further comprising isolating the first token and the second token by identifying a specified punctuation between the first token and the second token in the address string.

* * * * *